US007105206B1

(12) United States Patent
Beck et al.

(10) Patent No.: US 7,105,206 B1
(45) Date of Patent: Sep. 12, 2006

(54) LIGHT CURING OF RADIATION CURABLE MATERIALS UNDER PROTECTIVE GAS

(75) Inventors: Erich Beck, Ladenburg (DE); Oliver Deis, Rimbach (DE); Peter Enenkel, Hessheim (DE); Wolfgang Schrof, Neuleiningen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 57 days.

(21) Appl. No.: 10/130,599

(22) PCT Filed: Nov. 21, 2000

(86) PCT No.: PCT/EP00/11589

§ 371 (c)(1),
(2), (4) Date: May 21, 2002

(87) PCT Pub. No.: WO01/39897

PCT Pub. Date: Jun. 7, 2001

(30) Foreign Application Priority Data

Dec. 1, 1999 (DE) ................................ 199 57 900

(51) Int. Cl.
*C08J 7/04* (2006.01)
*C08J 7/18* (2006.01)
*C08F 2/46* (2006.01)
*C08F 2/48* (2006.01)

(52) U.S. Cl. ........................ 427/495; 427/508; 427/512

(58) Field of Classification Search ................ 427/494, 427/495, 508, 517, 518, 512
See application file for complete search history.

(56) References Cited

U.S. PATENT DOCUMENTS

| | | | | |
|---|---|---|---|---|
| 3,798,053 | A * | 3/1974 | Huemmer | 427/495 |
| 3,968,309 | A * | 7/1976 | Matsuo et al. | 428/409 |
| 4,181,752 | A * | 1/1980 | Martens et al. | 427/516 |
| 4,188,455 | A * | 2/1980 | Howard | 428/423.1 |
| 4,289,798 | A * | 9/1981 | Bagley et al. | 427/493 |
| 4,999,216 | A * | 3/1991 | Gaske et al. | 427/519 |
| 5,486,384 | A * | 1/1996 | Bastian et al. | 427/493 |
| 5,534,310 | A * | 7/1996 | Rokowski et al. | 427/494 |
| 5,712,316 | A * | 1/1998 | Dahmen et al. | 521/72 |
| 6,096,383 | A * | 8/2000 | Berg et al. | 427/493 |
| 6,185,840 | B1 * | 2/2001 | Noelle et al. | 34/278 |
| 6,764,719 | B1 * | 7/2004 | Russell et al. | 427/393.5 |
| 6,780,472 | B1 * | 8/2004 | Hamrock et al. | 427/402 |

FOREIGN PATENT DOCUMENTS

| | | |
|---|---|---|
| EP | 0 540 884 | 5/1993 |
| EP | 0 559 500 | 9/1993 |
| FR | 2 230 831 | 12/1974 |
| JP | 04258602 A * | 9/1992 |
| WO | 96 34700 | 11/1996 |

OTHER PUBLICATIONS

S.P.Pappas,Ph.D., ed., UV Curing: Science and Technology, tech. Marketing Corp., Stamford, Conn., USA, 1978 (no month), excerpt p. 102-113.*

Translation of JP04-258602, pub Sep. 14, 1992 to Shinkai et al.*

U.S. Appl. No. 11/324,559, filed Jan. 4, 2006, Beck et al.

* cited by examiner

*Primary Examiner*—Marianne Padgett
(74) *Attorney, Agent, or Firm*—Oblon, Spivak, McClelland, Maier & Neustadt, P.C.

(57) ABSTRACT

A process is described for producing molding compounds and coatings on substrates by curing radiation-curable compositions under inert gas by exposure to light wherein said inert gas comprises a gas heavier than air, and lateral escape of the inert gas in the course of radiation curing is prevented by means of appropriate apparatus or other measures.

13 Claims, No Drawings

LIGHT CURING OF RADIATION CURABLE MATERIALS UNDER PROTECTIVE GAS

The invention relates to a process for producing molding compounds and coatings on substrates by curing radiation-curable compositions under inert gas by exposure to light, wherein said inert gas comprises a gas which is heavier than air, and lateral escape of the inert gas in the course of radiation curing is prevented by means of appropriate apparatus or other measures.

The radiation curing of free-radical polymerizable compounds, e.g., (meth)acrylate compounds, may be accompanied by severe oxygen inhibition of the polymerization or curing. This inhibition results in incomplete curing at the surface and thus, for example, in tacky coatings.

This oxygen inhibition effect may be lessened by using large amounts of photoinitiator, by using coinitiators, such as amines, by using high-dose high-energy UV radiation, with high-pressure mercury lamps, for example, or by adding barrier-forming waxes.

It is also known to conduct radiation curing under an inert gas, from, for example, EP-A-540 884 and from Joachim Jung, RadTech Europe 99, Nov. 8 to 11, 1999, in Berlin (UV Applications in Europe—Yesterday Today Tomorrow).

What is desired is a process of radiation curing in which there is no need for high-energy UV light sources and the safety measures they entail. At the same time, however, the process should be extremely simple to implement.

Radiation-curable compositions may be processed without water or organic solvents. The process of radiation curing is therefore suitable for coatings which are implemented in small or medium-sized workshops or in the domestic sphere. To date, however, the complexity of the process and the equipment required, especially the UV lamps, have prevented the use of radiation curing within these segments.

It is an object of the invention to provide a simple process of radiation curing which may be employed even in small workshops or in the domestic sphere and which is generally suitable for curing three-dimensionally coated articles.

We have found that this object is achieved by the process defined at the outset.

Using the process of the invention it is possible to cure coatings on planar surfaces (two-dimensional curing process) or else coatings on three-dimensional moldings (three-dimensional curing process) on all or a plurality of sides.

The process uses an inert gas heavier than air. The molar weight of the gas is therefore greater than 28.8 g/mol (corresponding to the molar weight of a gas mixture of 20% oxygen and 80% nitrogen), preferably greater than 32 and, in particular, greater than 35 g/mol. Suitable examples are hydrocarbons, halogenated hydrocarbons, and noble gases such as argon. Carbon dioxide is particularly preferred.

The carbon dioxide supply may be from pressurized containers, filtered combustion gases, e.g., natural gas, or in the form of dry ice. A dry ice supply is seen as advantageous, especially for applications in the nonindustrial or small-scale industrial segment, since dry ice may be transported and stored as solid in simple, foam-insulated containers. The dry ice may be used as it is; at the customary temperatures of use it is in gas form.

The inert gas is heavier than air, and so air is forced upward. It is necessary to prevent the lateral escape of the gas.

A wide variety of apparatus or other measures may be suitable for this purpose.

One possibility is to use one container as a dip tank. This technique is particularly suitable for the three-dimensional coating process.

The inert gas is introduced into the container and the air is forced from it.

The container now contains an inert gas atmosphere into which the substrate coated with the radiation-curable composition, or molding, may be dipped. It is then possible to carry out radiation curing, using sunlight or appropriately disposed lamps, for example.

In the case of the radiation curing of coated areas, especially floor areas, the area to be cured may be partitioned off by means of appropriate devices, especially movable partitions, so that the inert gas cannot escape during the period of irradiation.

By means of the process it is also possible to carry out coating and radiation curing of printable or printed substrates. Examples of suitable substrates include paper, cardboard, films or textiles. The radiation-curable coating in question may comprise the printing ink or an overprint varnish. Radiation curing may take place directly in the course of the printing process, e.g., in the printing machine. Printing processes that may be mentioned include offset, gravure, letterpress, flexographic, and pad printing processes.

In the course of radiation curing, the amount of oxygen in the inert gas atmosphere is preferably less than 15% by weight, with particular preference less than 10% by weight, with very particular preference less than 5% by weight, based on the total amount of gas in the inert gas atmosphere; with the process of the invention it is possible in particular and with ease to set oxygen contents of less than 1%, even less than 0.1%, and in fact even less than 0.01% by weight.

By inert gas atmosphere is meant the gas volume surrounding the substrate at a distance of up to 10 cm from its surface.

Where dry ice is used as the inert gas, charging the dip tanks—which may also be storage containers for dry ice—is simple. The consumption of carbon dioxide is directly determinable from the consumption of the solid dry ice. Dry ice evaporates directly at −78.5° C. to form gaseous carbon dioxide. As a result, in a tank, atmospheric oxygen is displaced upward out of the tank with little turbulence.

The residual oxygen may be measured using standard commercial atmospheric oxygen meters. The tank may be covered in order to minimize gas losses and also to counter any warming during nonoperating periods. Owing to the oxygen-reduced atmosphere in the dip tank and storage tank, and the associated risk of suffocation, appropriate safety measures should be taken. In adjacent working areas as well, sufficient ventilation and carbon dioxide dissipation should be ensured.

The coated articles may be lowered into the dip tank for exposure, individually using lifting and lowering apparatus or by means of apparatus of the conveyor belt type in the case of mass production coatings. In order to ensure that the article is flooded as fully as possible, without entraining too much air into the exposure zone, either slow lifting and lowering or the use of upstream and downstream flooders is appropriate. The upstream and downstream flooders are an extension of the inert gas tanks, in order to separate air turbulence zones from the exposure zone. For this purpose, starting from the exposure zone, the inert gas tank may be extended both in terms of height and in terms of breadth on both sides. The dimensions of the upstream flooders are dependent primarily on the rate of immersion and emersion and on the geometry of the article.

The duration of exposure depends on the desired degree of cure of the coating or molding. The degree of cure may be determined most simply from the detackification or from the resistance to scratching with a fingernail, for example, or with other articles such as pencil points, metal points or plastic points. Likewise suitable are paint industry standard chemical resistance tests, for example, toward solvents, inks, etc. Particularly suitable without damaging the coated surfaces are spectroscopic methods, especially Raman and infrared spectroscopy, or measurements of the dielectric or acoustic properties, etc. Radiation curing may take place by sunlight or by lamps which are preferably arranged in the dip tank in such a way as to ensure the desired curing of the coated substrates on all sides or a plurality of sides.

For two-dimensional immovable substrates, e.g. floors or articles fixed to the floor, it is possible to arrange simple enclosures in order to prevent the dissipation of carbon dioxide. Examples are the sealing of the door region in rooms, for example, up to 40 cm in height from the floor, using, for example, adhesively bonded films or erecting walls of wood, plastic, stretched films or paper webs. The introduction of the carbon dioxide gas may take place from gas bottles or in the form of dry ice. It is also possible to hang-mount dry ice containers, from which carbon dioxide is able to flow out onto the material to be cured.

The radiation-curable composition comprises radiation-curable compounds as binders. These are compounds containing free-radically or cationically polymerizable and thus radiation-curable ethylenically unsaturated groups. The radiation-curable composition preferably contains from 0.001 to 12, with particular preference from 0.1 to 8, with very particular preference from 0.5 to 7 mol of radiation-curable ethylenically unsaturated groups per 1000 g of radiation-curable compounds.

Examples of suitable radiation-curable compounds are (meth)acrylic compounds, vinyl ethers, vinylamides, unsaturated polyesters based, for example, on maleic acid or fumaric acid, with or without styrene as reactive diluent, or maleimide/vinyl ether systems.

Preference is given to (meth)acrylate compounds such as polyester (meth)acrylates, polyether (meth)acrylates, urethane (meth)acrylates, epoxy (meth)acrylates, silicone (meth)acrylates, and acrylated polyacrylates.

Preferably, at least 40 mol %, with particular preference at least 60 mol %, of the radiation-curable ethylenically unsaturated groups are (meth)acrylic groups.

The radiation-curable compounds may further contain reactive groups, e.g., melamine, isocyanate, epoxide, anhydride, alcohol, carboxylic acid groups for additional heat curing, e.g., by chemical reaction of alcohol, carboxylic acid, amine, epoxide, anhydride, isocyanate, or melamine groups (dual cure).

The radiation-curable compounds may be present, for example, as solutions, in an organic solvent or water, for example, as aqueous dispersions, or as powders.

Preferably, the radiation-curable compounds and thus the radiation-curable compositions as well are fluid at room temperature. The radiation-curable compositions contain preferably less than 20% by weight, in particular less than 10% by weight, of organic solvents and/or water. They are preferably free from solvent and free from water (100% solids).

As well as the radiation-curable compounds as binders, the radiation-curable compositions may comprise further constituents. Examples of suitable such constituents are pigments, leveling agents, dyes, stabilizers, etc.

For curing with UV light, photoinitiators are generally used.

Examples of suitable photoinitiators include benzophenone, alkylbenzophenones, halomethylated benzophenones, Michler's ketone, anthrone, and halogenated benzophenones. Benzoin and its derivatives are also suitable. Likewise effective photoinitiators are anthraquinone and many of its derivatives, examples being β-methylanthraquinone, tert-butylanthraquinone, and anthraquinonecarboxylic esters, and—particularly effective—photoinitiators containing an acylphosphine oxide group, such as acylphosphine oxides or bisacylphosphine oxides, e.g., 2,4,6-trimethylbenzoyldiphenylphosphine oxide (Lucirin®TPO).

Where the radiation-curable compositions comprise photoinitiators, these photoinitiators ought to have absorption wavelengths in the range of the emitted light. Suitable photoinitiators for visible light, which contains no UV components, are in particular the abovementioned photoinitiators containing acylphosphine oxide groups.

It is an advantage of the invention that the amount of photoinitiators in the radiation-curable composition may be low or that photoinitiators may be foregone entirely.

The radiation-curable compositions preferably contain less than 10 parts by weight, in particular less than 4 parts by weight, with particular preference less than 1.5 parts by weight, of photoinitiator per 100 parts by weight of radiation-curable compounds.

In particular, an amount of from 0 part by weight to 1.5 parts by weight, especially from 0.01 to 1 part by weight, of photoinitiator is sufficient.

The radiation-curable composition may be applied to the target substrate or brought into the appropriate shape by means of customary techniques.

Radiation curing may then take place as soon as the substrate is surrounded by the inert gas.

Radiation curing may be carried out with all lamps also used to date for radiation curing. Radiation curing may be carried out using electron beams, X-rays or gamma rays, UV radiation, or visible light. It is an advantage of the process of the invention that the radiation curing may be carried out using visible light comprising little or no wavelengths below 300 nm.

In the process of the invention, therefore, radiation curing may take place with sunlight or with lamps used as sunlight substitutes. These lamps emit in the visible range above 400 nm and comprise few or no UV light components below 300 nm.

In the process of the invention, in particular, the fraction of radiation in the wavelength range below 300 nm is less than 20%, preferably less than 10%, with particular preference less than 5%, in particular less than 1 or 0.5%, or less than 0.1% of the integral of the emitted intensity over the entire wavelength range below 1000 nm.

The aforementioned radiation comprises the radiation which is actually available for curing, i.e., when filters are used, the radiation following passage through the filters.

Suitable lamps are those having a linear spectrum that is, lamps which emit only at certain wavelengths. Examples include light emitting diodes and lasers.

Likewise suitable are lamps having a broadband spectrum—that is, lamps where the light emitted is distributed over a wavelength range. In this case the intensity maximum is preferably in the visible range above 400 nm.

Examples that may be mentioned include incandescent lamps, halogen lamps, xenon lamps. Mention may also be made of mercury vapor lamps with filters to prevent or reduce radiation below 300 nm.

Likewise suitable are pulsed lamps, e.g., photographic flashlamps, or high-performance flashlamps (from VISIT). A particular advantage of the process is the capacity to use lamps with a low energy consumption and low UV fraction, e.g., 500-watt halogen lamps, as used for general lighting purposes. As a result there is no need either for a high-voltage current supply unit (in the case of mercury vapor lamps) or, possibly, for light protection measures. Furthermore, with halogen lamps, even in air, there is no risk posed by evolution of ozone, as with shortwave UV lamps. This facilitates radiation curing using portable exposure units and enables applications "in situ", i.e., independently of fixed industrial curing installations.

For mobile use and for applications requiring a large number of lamps to illuminate the substrate, particularly suitable sources are lamps comprising lamp housings with reflector, possibly cooling devices, radiation filters, and power supply connections, which have a low weight of, for example, below 20 kg, preferably below 8 kg.

Particularly lightweight lamps, for example, are halogen lamps, incandescent lamps, light emitting diodes, portable lasers, photographic flashlamps, etc. A further feature of these lamps is their particular ease of installation in container interiors or container walls. There is also a reduction in the technical complexity of power supply, especially in comparison with the medium- and high-pressure mercury vapor lamps which have been the industry standard to date. Preferred power sources for the lamps, apart from mains power supply, comprise, in particular, standard household alternating voltage, e.g., 220 V/50 Hz, or supply using portable generators, batteries, accumulators, solar cells, etc.

The process of the invention is suitable for producing coatings on substrates and for producing moldings.

Examples of suitable substrates include those of wood, plastics, metal, mineral materials or ceramics.

Examples of moldings include composite materials, comprising meshes or fiber materials impregnated with radiation-curable composition, for example, or moldings for stereolithography.

A further advantage of the process is that the distances between lamps and radiation-curable composition can be increased relative to curing in air. Overall, it is possible to use lower radiation doses, and one emitter unit may be used to cure relatively large areas.

Consequently, in addition to customary applications of radiation curing, the process also allows new applications in the field of the curing of coatings and molding compounds of complex three-dimensionally shaped articles, e.g., furniture, vehicle bodies, in the construction of casings and instruments, for mobile applications such as floor coating. Owing to the low level of technical and material expenditure, the process is also suitable for small and medium-sized workshops, homeworkers and the do-it-yourself segment.

EXAMPLES

Example 1

A radiation-curable composition is prepared by mixing the following constituents:

| | |
|---|---|
| 35% by weight of | Laromer ® LR 8987 (BASF Aktiengesellschaft), a urethane acrylate |
| 20% by weight of | hexanediol diacrylate, |
| 38.5% by weight of | Laromer ® LR 8863, a polyether acrylate |
| 3.5% by weight of | Irgacure ® 184 (Ciba Spezialitätenchemie), a photoinitiator |
| 0.5% by weight of | Lucirin ® TPO (BASF), a photoinitiator |
| 2% by weight of | Tinuvin ® 400 (Ciba Spezialitätenchemie), a UV absorber |
| 1.5% by weight of | Tinuvin ® 292, a UV absorber |

This composition is used to coat (film thickness 50 μm) a pane of glass.

500 g of dry ice are introduced into a container 60 cm deep with a diameter of 40 cm. After about 60 minutes, the residual oxygen content approximately 10 cm below the top edge of the container is 3% by weight and at a depth of 45 cm is 0.01% by weight. The pane of glass is inserted at the 45 cm level and exposed for 2 minutes using a 500 watt halogen lamp at a distance of 50 cm from the halogen lamp. The coating is high scratch resistant and cannot be scratched under manual pressure and with rubbing, either with a wooden spatula or with white typewriter paper.

For comparison, exposure is carried out under the same conditions but in air. The coating remained liquid. In comparison, exposure was carried out twice on a conveyor belt at a belt speed of 10 m/min under a 120 W/cm high-pressure mercury lamp (from IST) at a distance of 15 cm from the lamp. The coating could not be cured to a scratch resistant state.

Example 2

The radiation-curable composition was as in Example 1.

The radiation-curable composition was applied as clearcoat to the housing of an exterior automobile mirror and cured in accordance with the invention as described in Example 1. The coating obtained was highly scratch resistant.

We claim:

1. A process for coating a floor, comprising:

coating the surface of the floor with a radiation-curable composition, placing vertical partitions along the boundaries of the floor, wherein the partitions prevent the lateral escape of gas, then introducing carbon dioxide gas to form a carbon dioxide gas-containing atmosphere over the floor, then exposing the radiation-curable composition-coated floor surface to light radiation to cure the radiation-curable composition.

2. The process of claim 1, wherein introducing the carbon dioxide gas into the enclosed environment includes:

placing dry ice over the floor to force air upward, and evaporating the dry ice to form the carbon dioxide gas-containing atmosphere.

3. The process of claim 1, wherein the carbon dioxide gas is introduced from gas bottles.

4. The process of claim 1, wherein the amount of oxygen gas present in the carbon dioxide gas-containing atmosphere is 15% by weight or less based on the total amount of gas in the carbon dioxide gas-containing atmosphere.

5. The process of claim 1, wherein the amount of oxygen gas present in the carbon dioxide gas-containing atmosphere is 1% by weight or less based on the total amount of the gas in the carbon dioxide gas-containing atmosphere.

6. The process of claim 1, wherein the amount of oxygen gas present in the carbon dioxide gas-containing atmosphere is 0.1% by weight or less based on the total amount of gas in the carbon dioxide gas-containing atmosphere.

7. The process as claimed in claim 1, wherein the radiation-curable composition comprises from 0.001 to 12 mol of radiation-curable ethylenically unsaturated groups per 1,000 gm of the radiation-curable composition.

8. The process of claim 7, wherein at least 60 mol % of the radiation-curable ethylenically unsaturated groups are (meth) acrylic groups.

9. The process as claimed in claim 1, wherein the radiation-curable composition comprises less than 10 parts by weight of a photoinitiator per 100 parts by weight of the total amount of the radiation-curable composition.

10. The process as claimed in claim 1, wherein the radiation is light having a wavelength above 300 nm.

11. The process of claim 1, wherein the floor is made of one or more selected from the group consisting of a wood, a plastic, a metal, a mineral material and a ceramic.

12. The process of claim 1, wherein placing partitions around at least a portion of the floor includes adhesively bonding a film to the floor up to a height of 40 cm from the floor.

13. The process of claim 1, wherein the dry ice is placed over the floor by hang mounting one or more dry ice containers above the floor.

* * * * *